(12) United States Patent
Wang et al.

(10) Patent No.: US 10,770,036 B2
(45) Date of Patent: Sep. 8, 2020

(54) PRESENTATION OF CONTENT ON LEFT AND RIGHT EYE PORTIONS OF HEADSET

(71) Applicant: Lenovo (Singapore) Pte. Ltd., Singapore (SG)

(72) Inventors: Song Wang, Cary, NC (US); John Weldon Nicholson, Cary, NC (US); Jatinder Kumar, Cary, NC (US); Ming Qian, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/113,630

(22) Filed: Aug. 27, 2018

(65) Prior Publication Data
US 2020/0066237 A1    Feb. 27, 2020

(51) Int. Cl.
*G09G 5/38*      (2006.01)
*G02B 27/01*      (2006.01)
*G06F 3/0482*      (2013.01)
*G06F 3/16*      (2006.01)
*G06F 3/01*      (2006.01)
*G06F 3/0481*      (2013.01)

(52) U.S. Cl.
CPC ........... *G09G 5/38* (2013.01); *G02B 27/0172* (2013.01); *G02B 27/0179* (2013.01); *G02B 2027/0141* (2013.01); *G06F 3/013* (2013.01); *G06F 3/017* (2013.01); *G06F 3/0482* (2013.01); *G06F 3/04817* (2013.01); *G06F 3/167* (2013.01); *G09G 2354/00* (2013.01)

(58) Field of Classification Search
CPC .. G09G 5/38; G09G 2354/00; G02B 27/0179; G02B 27/0172; G06F 3/04817; G06F 3/017; G06F 3/013; G06F 3/0482; G06F 3/167
See application file for complete search history.

(56) References Cited

U.S. PATENT DOCUMENTS

| | | | | |
|---|---|---|---|---|
| 5,825,340 A * | 10/1998 | Torizuka | ............ | G02B 27/0172 345/8 |
| 6,061,064 A * | 5/2000 | Reichlen | ................. | G06F 3/011 345/418 |
| 6,396,497 B1 * | 5/2002 | Reichlen | ................. | G06F 3/011 345/427 |
| 6,417,969 B1 * | 7/2002 | DeLuca | ................. | G06F 3/011 359/630 |
| 6,507,359 B1 * | 1/2003 | Muramoto | ............. | H04N 5/772 348/47 |
| 7,743,340 B2 * | 6/2010 | Horvitz | ................ | G05B 19/404 715/710 |
| 9,007,301 B1 * | 4/2015 | Raffle | .................... | G09G 3/003 345/156 |

(Continued)

*Primary Examiner* — Benyam Ketema
(74) *Attorney, Agent, or Firm* — John M. Rogitz; John L. Rogitz

(57) ABSTRACT

In one aspect, a device includes at least one processor and at least one display accessible to the at least one processor. The at least one display includes a left eye portion and a right eye portion. The device also includes storage that is accessible to the at least one processor and that has instructions executable by the at least one processor to present first content on one of the left eye portion and the right eye portion so that the first content is viewable respectively using one of a user's left eye and the user's right eye but not the other of the user's left eye and the user's right eye.

20 Claims, 9 Drawing Sheets

(56) References Cited

U.S. PATENT DOCUMENTS

| | | | |
|---|---|---|---|
| 9,635,222 B2* | 4/2017 | Blum | H04N 5/2251 |
| 9,964,766 B2* | 5/2018 | Kon | G06F 3/011 |
| 2009/0035364 A1* | 2/2009 | Galopin | A61K 8/347 |
| | | | 424/450 |
| 2010/0157432 A1* | 6/2010 | Sugihara | G02B 27/0172 |
| | | | 359/630 |
| 2014/0196193 A1* | 7/2014 | Namy | A41D 1/065 |
| | | | 2/227 |
| 2014/0285404 A1* | 9/2014 | Takano | G06F 3/005 |
| | | | 345/8 |
| 2015/0156196 A1* | 6/2015 | Kim | G06F 21/32 |
| | | | 345/156 |
| 2015/0269783 A1* | 9/2015 | Yun | G02B 27/0172 |
| | | | 345/633 |
| 2015/0379892 A1* | 12/2015 | Sako | G06F 19/3475 |
| | | | 434/127 |
| 2016/0203359 A1* | 7/2016 | von und zu Liechtenstein | |
| | | | G06K 9/00335 |
| | | | 345/156 |
| 2016/0274661 A1* | 9/2016 | Maeda | G06F 3/013 |
| 2017/0160550 A1* | 6/2017 | Kobayashi | G02B 27/017 |
| 2017/0199543 A1* | 7/2017 | Rhee | G02B 27/017 |

* cited by examiner

PRESENTATION OF CONTENT ON LEFT AND RIGHT EYE PORTIONS OF HEADSET

BACKGROUND

Augmented reality (AR) headsets, so-called "smart" glasses and other types of augmented and virtual reality devices are becoming increasingly prevalent in today's technology marketplace. However, as recognized herein, in certain settings it may be desirable for a user to have different contents presented to different eyes, e.g., while wearing a headset. For example, if a physician were performing surgery while wearing a headset and wanted to see certain a live video feed from the camera on an endoscope that is being used, but the physician only wanted to see it using his/her right eye since the physician may also want to see surgery instructions using his/her left eye, there are currently no adequate solutions to this computer-related, technological problem that would allow the physician to do so.

SUMMARY

Accordingly, in one aspect a device includes at least one processor and at least one display accessible to the at least one processor. The at least one display includes a left eye portion and a right eye portion. The device also includes storage that is accessible to the at least one processor and that has instructions executable by the at least one processor to present first content on one of the left eye portion and the right eye portion so that the first content is viewable respectively using one of a user's left eye and the user's right eye but not the other of the user's left eye and the user's right eye.

In another aspect, a method includes presenting first content on a right eye portion of at least one display of a device but not a left eye portion of the at least one display of the device. The method also includes receiving input to present second content on the left eye portion and presenting, based on receipt of the input, the second content on the left eye portion.

In still another aspect, a computer readable storage medium (CRSM) that is not a transitory signal includes instructions executable by at least one processor to present first content on one of a left eye portion of at least one display and a right eye portion of the at least one display so that the first content is viewable via one of the left eye portion and the right eye portion but not the other of the left eye portion and the right eye portion.

The details of present principles, both as to their structure and operation, can best be understood in reference to the accompanying drawings, in which like reference numerals refer to like parts, and in which:

DETAILED DESCRIPTION

Figure 1:
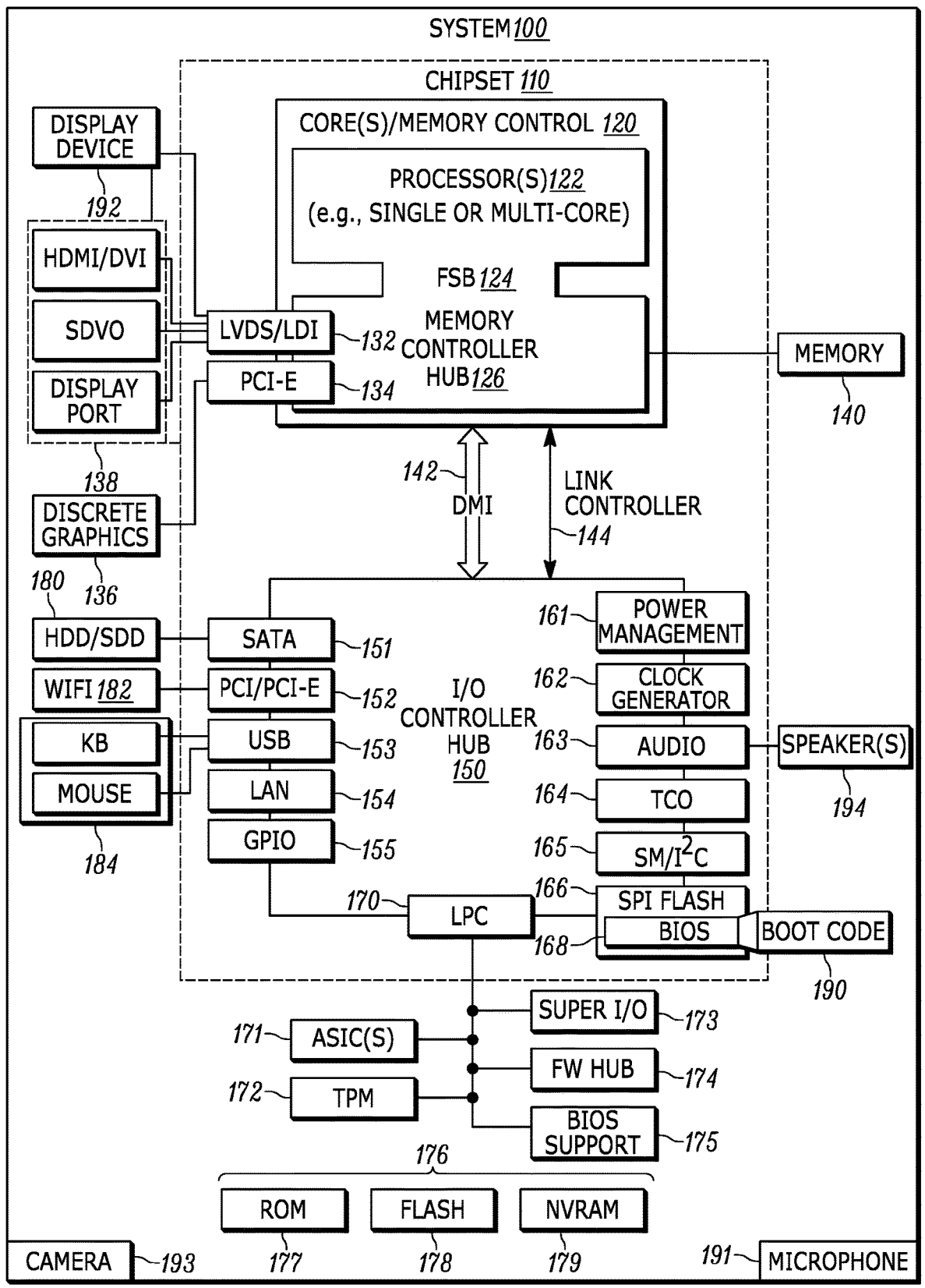
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system, hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include an audio receiver/microphone 191 that may provide input from the microphone to the processor 122 based on audio that is detected, such as via a user providing audible input to the microphone. The system may also include one or more cameras 193 that may gather one or more images and provide them and related input to the processor 122. The camera(s) 193 may be a thermal imaging camera, a digital camera such as a webcam, an infrared (IR) camera, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
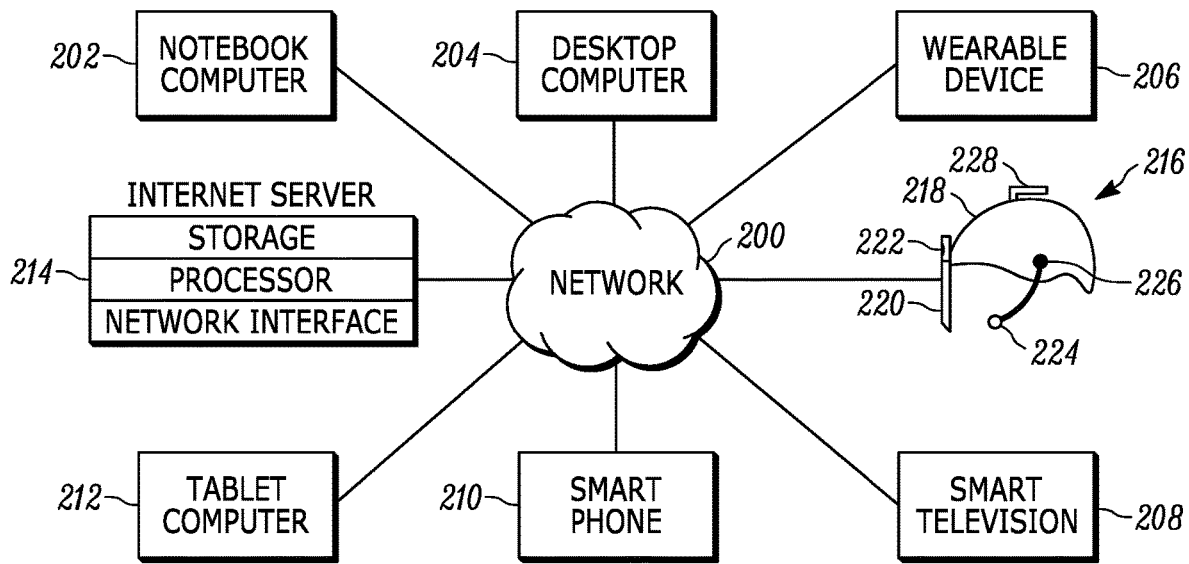
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212 and 216. It is to be understood that the devices 202-216 are configured to communicate with each other over the network 200 to undertake present principles.

Describing the headset 216 in more detail, it may be an augmented reality (AR) headset in some examples, while it may be Internet-enabled computerized glasses in other examples. Still other types of headsets may also be used to present content as disclosed herein, such as a virtual reality (VR) headset that may present a camera feed of the user's real-world environment on its display so that content as described herein can be overlaid on the camera feed.

The headset 216 may include a housing 218 to which a display 220 is coupled for presenting content in accordance with present principles. In AR scenarios, the display 220 may be an at least partially transparent display such as a "heads-up" display and may permit a wearer of the headset to view real-world objects through it while wearing the headset 216, while also being configured to present content on the display 220 itself such AR images/graphics, etc.

The headset 216 may also include plural cameras 222 that may each be similar in function and configuration to the camera 193 described above, with at least one of the cameras 222 oriented to image a wearer's eyes while the user wears the headset 216. The images may then be processed using eye tracking software for infrared (IR) eye tracking and/or to determine which of the user's eyes are open or closed at a given moment for determining which content to present and whereas disclosed herein.

Another one of the cameras 222 may be oriented away from the headset 216 to image the user's environment according to a field of view of the user and to also help identify any gesture input that might be performed by the user in free space while wearing the headset 216. Accordingly, the camera(s) oriented away from the headset 216 to image the user's environment may be juxtaposed on the bridge of the headset 216 that extends between a user's eyes and over the user's nose while wearing the headset 216.

The headset 216 may also include a microphone 224 that may be similar in function and configuration to the microphone 191 for receiving voice input, a speaker 226 that may be similar in function and configuration to the speaker(s) 194, and one or more head-engagement members 228 for a user to dispose the headset 216 on his or her head. Though not shown for clarity, it is to be understood that the headset 216 may also include a network interface for wired and/or wireless communication with the other devices of FIG. 2 such as via the Internet, a local area network (LAN), a Bluetooth network, as well as a processor, storage, a battery pack or other power source, etc.

Figure 3:
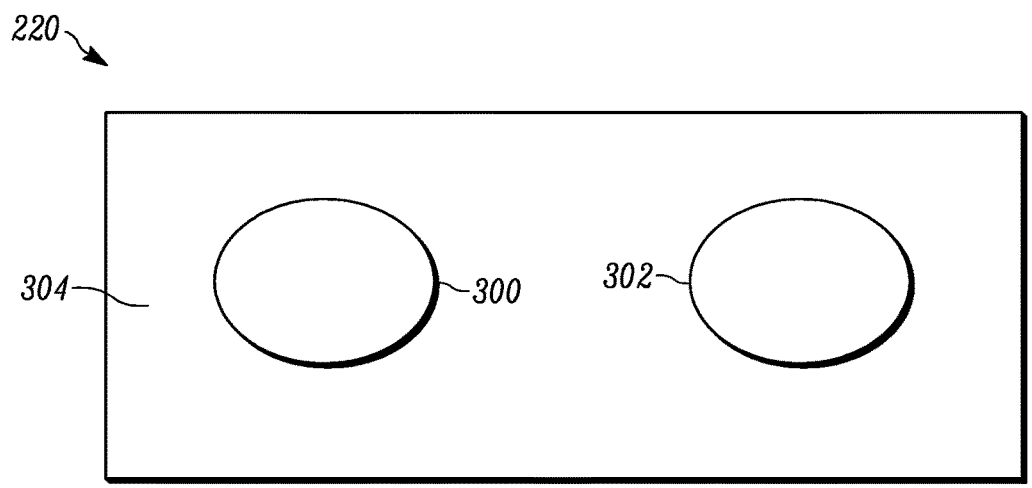
FIG. 3 shows an example headset display from an elevational view of the display's rear surface in accordance with present principles.

Referring to FIG. 3, it shows an elevation view of an example embodiment of the rear surface of the display 220 in more detail. In other words, the display 220 as reflected in FIG. 3 shows an example embodiment of the surface of the display that faces the user while wearing the headset 216 so that the user can look through an at least partially transparent discrete left eye portion 300 with the user's left eye and through an at least partially transparent discrete right eye portion 302 with the user's right eye. However, note that in other embodiments the portions 300, 302 may not be separated from each other by a portion of the headset's housing 304 but may instead form part of a unitary lens or display that nonetheless has a left eye portion at which content may be presented that is only perceptible while the headset 216 is worn using the left eye and that has a right eye portion at which content may be presented that is only perceptible while the headset 216 is worn using the right eye.

But regardless, it is to be understood that in either case a user is able to see real-world objects through portions 300, 302 while also being able to see augmented reality (AR) or virtual reality (VR) images as well as still other content that may be presented via electronic displays integrated into the portions 300, 302. For instance, AR images may be presented at the portions 300, 302 using stereoscopy and AR/VR software while the user is still able to see at least some of his/her real-world surroundings through the portions 300, 302.

With the foregoing left and right eye portions 300, 302 in mind, it is to be understood that in at least some embodiments the headset may present different contents (such as different media files stored at different electronic storage locations) to each respective eye via the respective portions 300, 302 when the other eye is identified as closed, and to present still other content when both of the user's eyes are identified as open. Alternatively, in some embodiments the same content may be switched from only being presented to the left eye via portion 300 when the right eye is identified as closed to only being presented to the right eye via portion 302 when the left eye is identified as closed, and vice versa.

Figure 4:
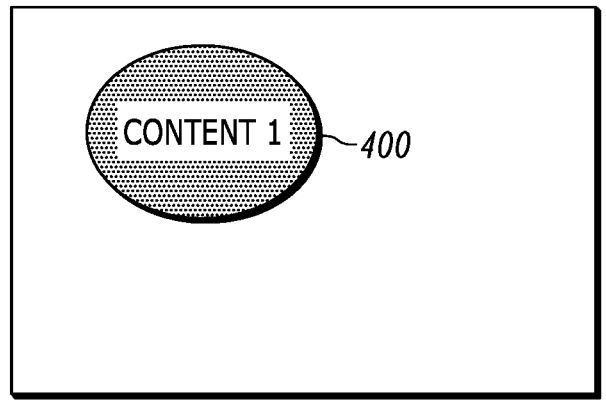
FIGS. 4-6 and 13 are example illustrations in accordance with present principles.
Figure 6:
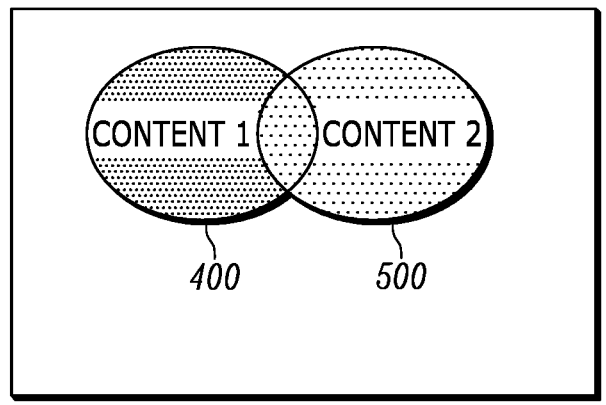

As an example, in FIG. 4 content 400 that is generally designated "content 1" may be presented in a left eye quadrant of the headset display's left eye portion 300 but not using the right eye portion 302. This may have been done by the headset responsive to identification of the user closing his/her right eye but keeping his/her left eye open. Furthermore, in some embodiments "content 1" may then continue to be presented via the left eye portion 300 even when both of the user's eyes are identified as open so that the user can continue to see "content 1" using his/her left eye while concurrently looking through both portions 300, 302 using respective eyes (as represented in FIG. 6). However, in other embodiments "content 1" may cease to be presented and content different from "content 1" may be presented using both of the portions 300, 302 responsive to identification of both of the user's eyes as being open.

Figure 5:
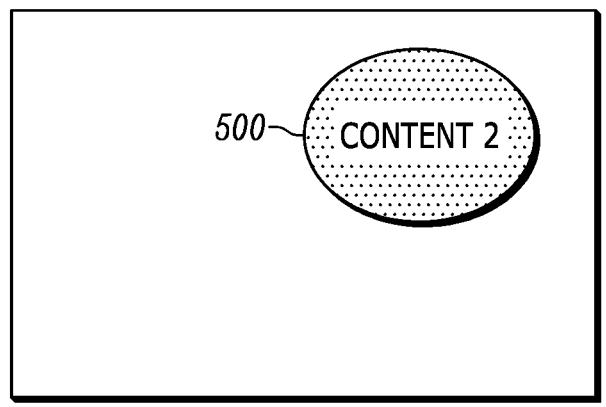

FIG. 5 shows content 500 different from "content 1" and generally designated "content 2". "Content 2" may be presented in a right eye quadrant of the headset display's right eye portion 302 but not using the left eye portion 300. This may have been done by the headset responsive to identification of the user closing his/her left eye but keeps his/her right eye open. Furthermore, in some embodiments "content 2" may then continue to be presented via the right eye portion 302 even when both of the user's eyes are identified open so that the user can continue to see "content 2" using his/her right eye while concurrently looking through both portions 300, 302 using respective eyes (again as represented in FIG. 6). However, in other embodiments "content 2" may cease to be presented and content different from "content 1" and "content 2" may be presented using both of the portions 300, 302 responsive to identification of both of the user's eyes as being open.

Reference is now made to FIG. 6. It shows the perspective of the user according to one of the embodiments referenced above. Specifically, the user can see "content 1" using the left eye as may be presented using the left eye portion 300 and can see "content 2" using the right eye as may be presented using the right eye portion 302 while both eyes are open. This is owing to "content 1" being assigned to the user's left eye and "content 2" being assigned to the user's right eye.

It is to be understood more generally in accordance with present principles that content presented on the left and right eye portions 300, 302 may include video or live feeds, still images, graphical user interfaces, graphical objects, AR objects or AR video specifically, and still other types of content. Thus, for example, during an operation or training a physician may find himself or herself in a situation where he/she is naturally inclined to close his/her left eye when performing a given procedure and would like live footage of an endoscope's camera presented to the right eye. Then when the physician switches to viewing things using the left eye with the right eye closed, or switches to having both eyes open, the physician may either wish to see different content (such as text of a sequence of steps to perform as part of the procedure) or have the live footage move to the left eye portion of the headset for presentation to the left eye. Additionally, in some examples where the physician switches to both eyes open, stereoscopy and AR software may be employed to render a three-dimensional or stereoscopic version of the live footage from the base feed that is then perceptible using both eyes. In any case, touch input, gesture input, voice input, and gaze input may all be used alone or in combination to provide input to the headset to indicate to the headset which eye is to have which content presented to it, as will be described more fully below.

Figure 7:
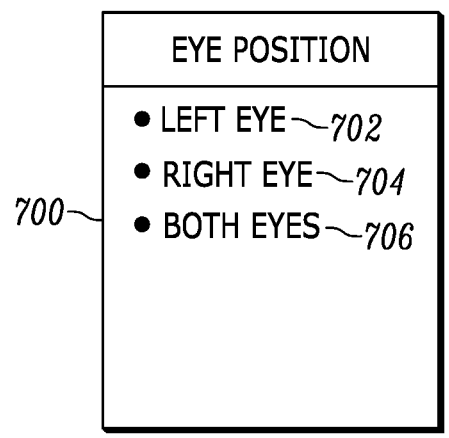
FIGS. 7-11 are example graphical user interfaces (GUIs) in accordance with present principles.

Accordingly, FIG. 7 shows an example graphical user interface (GUI) 700 presentable on the display of a headset (or the display of another device such as a smart phone in communication with the headset) in accordance with present principles. The GUI 700 may allow a user, via respective selectors 702, 704, and 706, to select an eye(s) and hence eye portion of the headset's display to which content should be presented. Thus, selector 702 may be selected to select the user's left eye (e.g., via voice input of words corresponding to text for the selector 702, such as "left eye"), selector 704 may be selected to select the user's right eye (e.g., via voice input of "right eye"), and selector 706 may be selected to select both eyes (e.g., via voice input of "both eyes").

The GUI 700 itself may be navigated to from a main settings menu for the headset, and/or by requesting the GUI 700 specifically using voice input. For example, the user may provide voice input of "eye position" as detected by the headset's microphone. This voice input may then be processed by the headset using voice recognition to determine that the GUI/menu 700 is being requested so that the user can select an eye from the GUI 700 to which a given piece of content may be presented.

Figure 8:
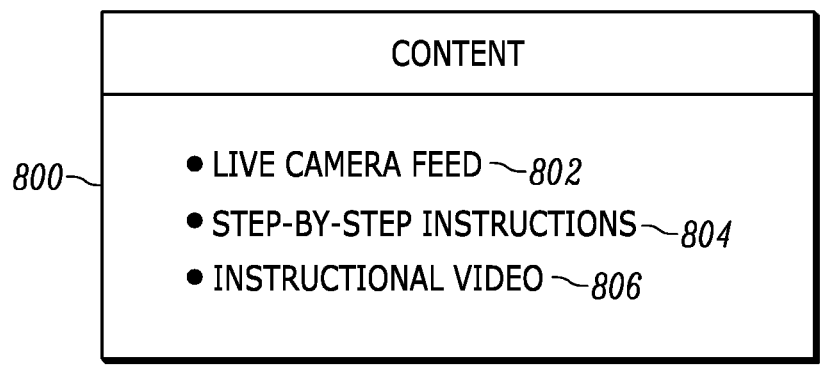

The user may also select a particular piece of content to be presented to the eye selected from the GUI 700, also using voice input or another type of input. For instance, after making a selection from the GUI 700, the user may provide voice input indicating "next" or otherwise provide input to move to a next screen. Additionally, or alternatively, the user may simply provide voice input indicating "select content" regardless of any previous selection that might have occurred or GUI that might have been presented. Once one of these user inputs is identified by the headset, it may present the GUI 800 shown in FIG. 8.

The GUI 800 may include one or more selectors 802, 804, and 806 for selecting different pieces of content associated with each selector. In this example, selector 802 may be selectable to select a live camera feed piece of content (e.g., via voice input of words corresponding to text for the selector 802, such as "live camera feed"), selector 804 may be selectable to select step-by-step text instructions content (e.g., via voice input of "step-by-step instructions"), and selector 806 may be selectable to select a prerecorded instructional video piece of content (e.g., via voice input of "instructional video").

Figure 9:
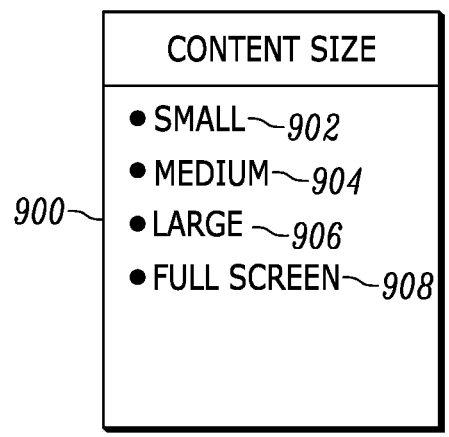

FIG. 9 shows yet another GUI 900 that may be presented in accordance with present principles for a user to initiate or modify content presentation. The GUI 900 may allow a user to select a size at which content should be presented to the selected eye(s) and may be presented responsive to a "next screen" voice command after making a selection from the GUI 800, or a "content size" voice command regardless of any previous selection that might have occurred or GUI that might have been presented. In any case, the GUI 900 may include one or more selectors 902, 904, 906, and 908 for selecting different sizes associated with each selector. In this example, selector 902 may be selectable to select small content size (e.g., via voice input of a word corresponding to text for the selector 902, such as "small"), selector 904 may be selectable to select medium content size (e.g., via voice input of "medium"), selector 906 may be selectable to select large content size (e.g., via voice input of "large"), and selector 908 may be selectable to select full screen mode for presenting content (e.g., via voice input of "full screen").

Figure 10:
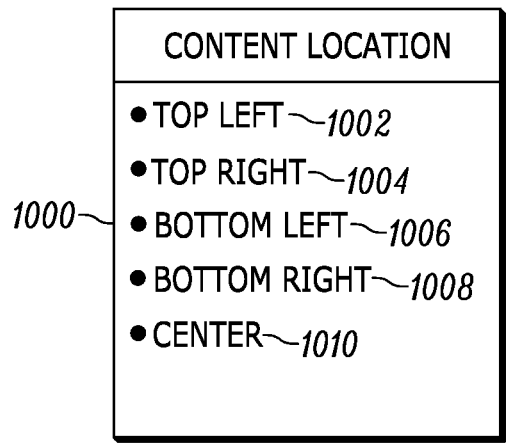

Now in reference to FIG. 10, it shows yet another GUI 1000 that may be presented in accordance with present principles for a user to initiate or modify content presentation. The GUI 1000 may allow a user to select a location on a given left or right eye portion at which content should be presented. The GUI 1000 itself may be presented responsive to a "next screen" voice command after making a selection from the GUI 900, or a "content location" voice command regardless of any previous selection that might have occurred or GUI that might have been presented. In any case, the GUI 1000 may include one or more selectors 1002, 1004, 1006, 1008, and 1010 for selecting different locations associated with each selector. In this example, selector 1002 may be selectable to select a top left location for one of the eye portions (e.g., via voice input of a word corresponding to text for the selector 902, such as "top left"), selector 1004 may be selectable to select a top right location for one of the eye portions (e.g., via voice input of "top right"), selector 1006 may be selectable to select a bottom left location for one of the eye portions (e.g., via voice input of "bottom left"), selector 1008 may be selectable to select a bottom right location for one of the eye portions (e.g., via voice input of "bottom right"), and selector 1010 may be selectable to select a center/middle location for one of the eye portions (e.g., via voice input of "center").

Then, after making selections from one or more of the GUIs 700, 800, 900, and 1000, the user may provide other voice input to the headset for the headset to present content according to the selections. For instance, a voice command of "present content" or "selection complete" may in turn cause content to be presented to the user's left eye, right eye, or both according to the user's selection(s) from the GUIs 700, 800, 900, and/or 1000.

Note that any of the types of voice input/commands disclosed herein may be customizable by a user so that the user can substitute a preconfigured command with any words/phrases that he/she can remember. Furthermore, selections from any of the GUIs disclosed herein may also be made via other modes of user input, such as gesture input, eye gaze input, or even touch input if the display on which a given GUI is presented is touch-enabled. Additionally, or alternatively, a combination of voice input, touch input, gesture input, and/or eye gaze input may be used.

For example, in a noisy environment where voice commands may not be feasible or optimal, gaze and/or gesture input can be used as substitute selection methods. E.g., for the GUIs 700-1000, a user may select or highlight one of the selectors by directing his/her gaze on a specific selector (as detected via eye tracking performed by the headset) to select or highlight the desired selector. Confirmation of a gaze selection may then be performed responsive to the headset identifying the passage of a threshold non-zero amount of time during which the user gazes at a given selector uninterruptedly. Additionally, or alternatively, a head nod up and down may confirm a selection whereas a head shake left to right or right to left may cancel or invalidate a highlighted selection. Still further, hand-based gestures may also be used to confirm a selection, such as an air tap gesture in free space while gazing at the selector of choice, or the use of another defined gesture such as a "click" or tap action in free space with a finger where the selector of choice appears to be located in three dimensional space to the user as the user looks through the headset's display.

Figure 11:
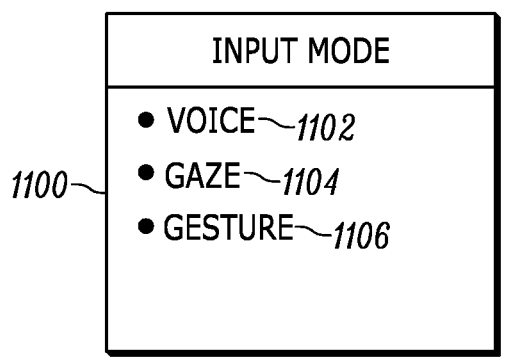

Continuing the detailed description in reference to FIG. 11, it shows yet another example GUI 1100 that may be presented on the headset's display or another display in communication with the headset. The GUI 1100 may be used for selecting one or more modes of user input to enable or make active in accordance with present principles. Selectors 1102, 1104, and 1106 are therefore presented, and more than one may be selected to enable more than one mode of user input at a given time. Each of the selectors 1102, 1104, and 1106 may themselves be selected using any of modes of user input discussed herein, including voice input and gesture input. As may be appreciated from FIG. 11, selector 1102 may be selectable to enable voice input, selector 1104 may be selectable to enable gaze input, and selector 1106 may be selectable to enable gesture input.

Figure 12:
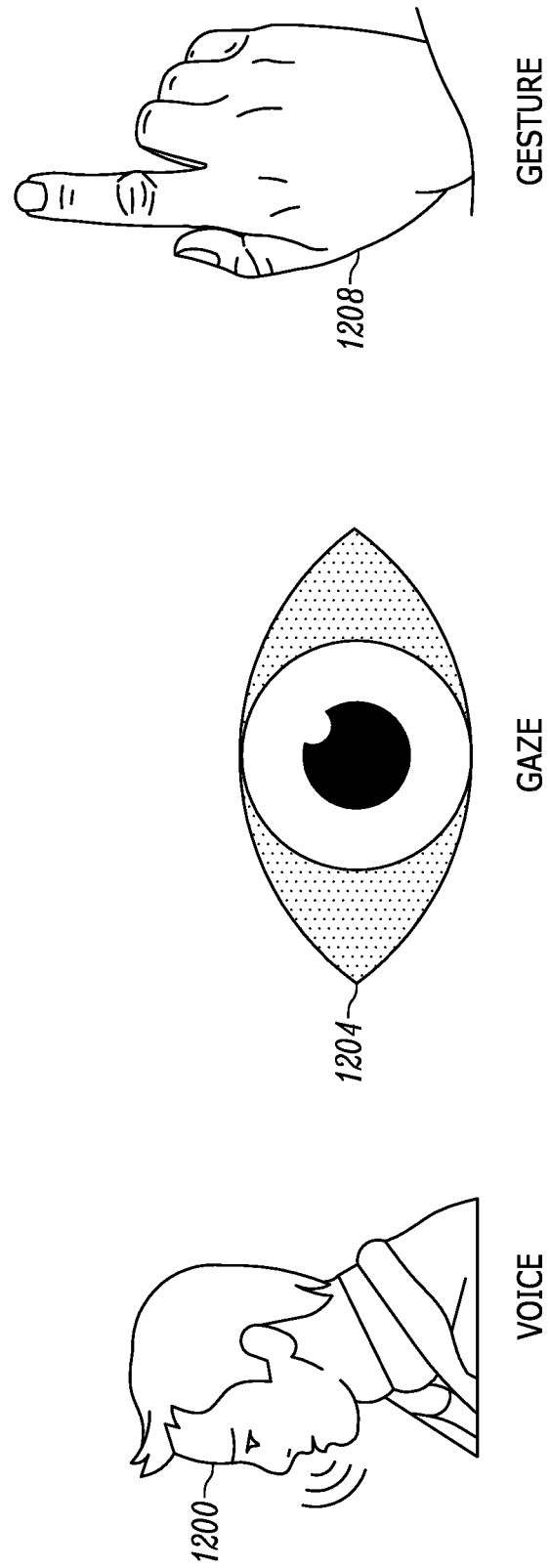
FIG. 12 shows example icons in accordance with present principles.

Then, once one or more of the selectors 1102, 1104, and 1106 have been selected, upon the user viewing his/her real-world environment through the display of the headset and/or while a selected piece of content is presented, the headset may present one or more of the icons 1200, 1204, and 1208 shown in FIG. 12 that correspond to respective modes of user input selected via one or more of the selectors 1102, 1104, and 1106. In some examples, the icons 1200, 1204, and 1208 may specifically be presented on a left or right eye portion of the headset's display that is also currently presenting content per user input as described herein. Icon 1200 indicates voice input has been enabled, icon 1204 indicates that gaze input has been enabled, and icon 1208 indicates that gesture input has been enabled.

Alternatively, in some embodiments each of the icons 1200, 1204, and 1208 may be presented regardless of any selections that might have been made from the GUI 1100 to instead indicate modes of user input that are available even if not currently enabled or active, with enabled/active modes of user input then being conveyed through one or more of the icons 1200, 1204, and 1208 being highlighted or colored differently from icons associated with modes of user input that have not been enabled/selected.

Additionally, if a user is already in the process of using the headset for content presentation under a selected or default setting and does not wish to go back to a main setting menu or process to make just one change to content presentation, the same user input modes of voice input, gaze input, and/or gesture input may still be used. Using voice input as an example, the same types of voice commands may be used as described elsewhere herein. For instance, "eye position" voice input may cause the GUI 700 to be presented, where a selection may be made and then content already being presented may be switched to a selected eye position without the user also navigating through the GUIs 800, 900, and 1000. Additionally, or alternatively, the user may simply provide a voice command of "switch eye position for content to right eye", which may in turn cause content already being presented to automatically switch from the headset's left eye portion the headset's right eye portion without presenting the GUI 700 at all, or any other GUI to make the switch.

Aside from voice input, gaze input and/or gesture input may also be used/enabled during content presentation for making various selections in accordance with present principles. For example, gaze and gesture commands may be enabled when the headset identifies the user as gazing at the corresponding icon 1204 or 1208 as presented in his/her field of view for more than a threshold non-zero amount of time. This may act as confirmation of selection/enablement of the given mode of user input associated with the icon being gazed at for more than the threshold non-zero amount of time.

Figure 13:
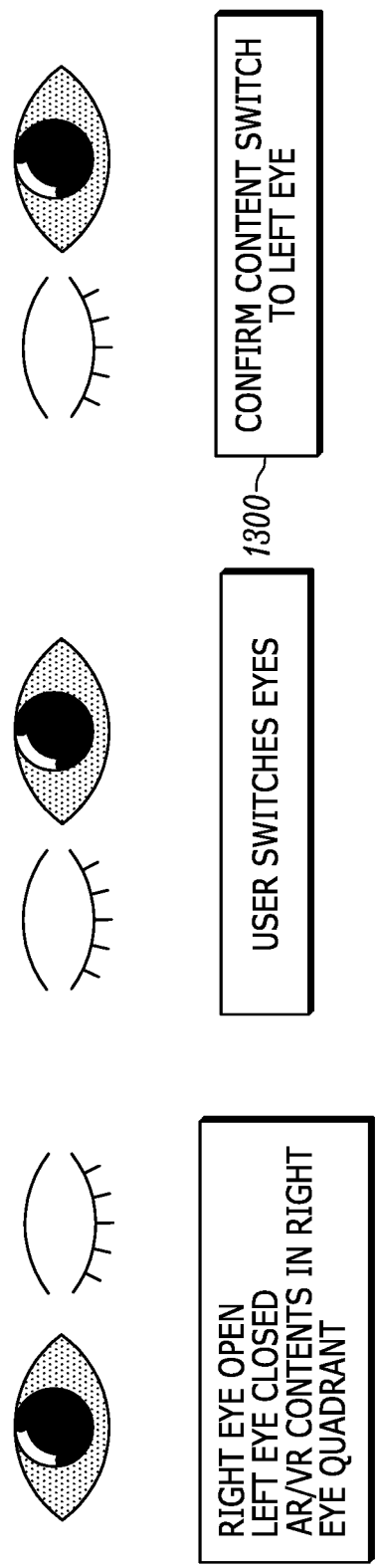

Also, note that in addition to or in lieu of selecting various settings in accordance with present principles (e.g., content location, size, etc.) via the GUIs and voice inputs disclosed herein, eye movements and open/closed eye arrangements may also be identified by the headset as user input that serves as a trigger for changing the location of where on the headset's display content is to be presented. For example, the headset may receive images from one of its cameras imaging the user's face and, using eye tracking software, detect which eye is open and which eye is closed. Assuming in this example that the user is using the headset under a right eye only setting where content is only being presented on a right eye portion of the headset's display, to switch to left eye content presentation the user may simply switch from right eye open, left eye closed to left eye open, right eye closed. Content may then be automatically switched, or upon detecting the left eye opening and/or right eye closing the headset may first present a confirmation message 1300 to the now-opened left eye via the headset display's left eye portion as represented in the illustration of FIG. 13 before performing the content switch.

The user may then confirm the switch through any of the enabled user input modes. For example, voice input of "yes" or "confirm" may be provided to confirm the switch, as well as gazing at the message 1300 for at least a threshold non-zero amount of time to confirm and/or providing a head nod or air tap while gazing at the message 1300.

However, if the user does not wish for the headset to perform the switch, the enabled user input modes may also be used to cancel the switch. For example, voice input of "no" or "cancel" may be provided to deny the switch, as well as allowing the message to be presented for a predefined amount of time without staring at it for the threshold non-zero amount of time discussed above and/or providing a head shake or finger wave. In the event the user cancels the switch, the content may continue to be presented on the right eye portion even though the user's right eye is now closed, and/or the content may cease being presented at all.

Figure 14:
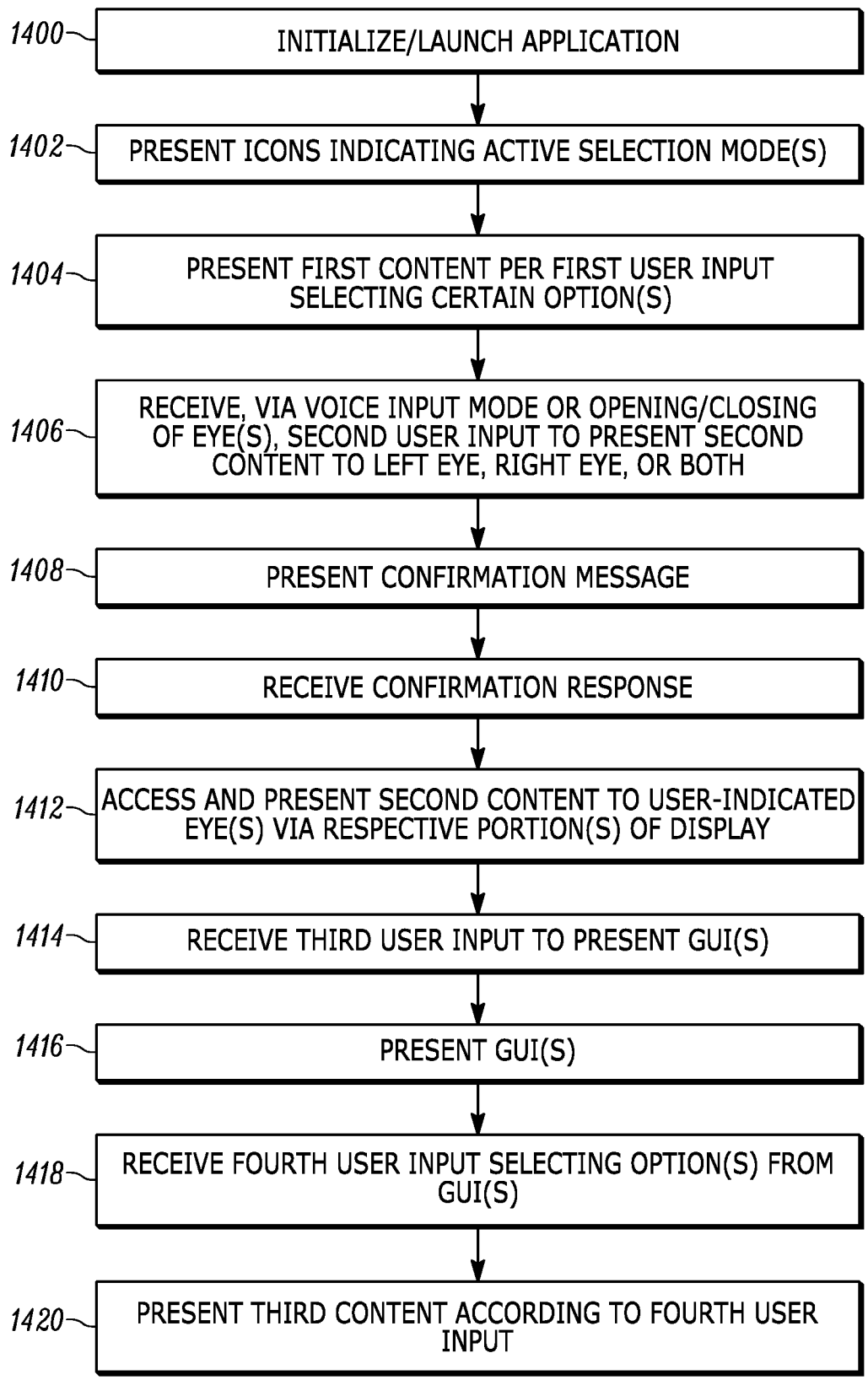
FIG. 14 is a flow chart of an example algorithm in accordance with present principles.

Referring now to FIG. 14, it shows example logic that may be executed by a headset in accordance with present principles, and/or by a smart phone or other device controlling the headset to undertake present principles. Note that while FIG. 14 illustrates the logic in flow chart format, state logic or other equivalent logic may be used.

FIG. 14 begins at block 1400 where the device may initialize and/or launch an application for presenting content and/or undertaking present principles. The logic may then move to block 1402 where the device may present icons indicating any active/enabled selection modes according to default settings that might already be configured by the user and/or device manufacturer. For instance, at block 1402 the device may present the icons 1200, 1204, and 1208 described above in reference to FIG. 12.

After block 1402 the logic may then proceed to block 1404. At block 1404 the device may present first content according to default content presentation settings and/or first user input that might be received that selects certain content presentation options. For instance, the first user input received at block 1404 may include one or more selections of selectors presented on the GUIs 700, 800, 900, and 1000 described above that might be selected by any of the active/enabled modes of user input indicated via the icons presented at block 1402.

From block 1404 the logic may then move to block 1406. At block 1406 the device may receive, via voice input and/or by detecting the user opening one eye and closing another or by detecting both eyes as open, second user input to present second content to the user's left eye, right eye, or both. The second content may be the same as the first content (e.g., switching display portions at which the same content is presented) or different from the first content (e.g., a separate media file than the first content that is stored at a different storage location than where the first content is stored). Responsive to receipt of the second user input, the device may automatically perform the switch without first presenting any of the GUIs of FIGS. 7-10. However, in other embodiments the device may first present a confirmation message at block 1408 to present the second content according to the second user input received at block 1406, then receive a response at block 1410 confirming presentation of the second content according to the second user input, and then access and present the second content at block 1412 according to the second user input received at block 1406.

After block 1412 the logic may then move to block 1414 where the device may receive third user input to present one or more of the GUIs described above in reference to FIGS. 7-10 and, in response to receiving the user input, present the GUIs on one or more portions of the headset's display at block 1416. Then at block 1418 the device may receive fourth user input, where the fourth user input may include one or more user selections from the GUIs 700, 800, 900, and 1000 of FIGS. 7-10.

Thereafter, the logic may move to block 1420 where the device may present third content according to the fourth user input. The third content may be the same as or different from the first and/or second contents but in any case, is presented according to one or more of the user selections received at block 1418.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;
   at least one display, the at least one display comprising a left eye portion and a right eye portion, the at least one display being accessible to the at least one processor; and
   storage accessible to the at least one processor and comprising instructions executable by the at least one processor to:
   present, using the device, first content on one of the left eye portion and the right eye portion so that the first content is viewable respectively using one of a user's left eye and the user's right eye but not the other of the user's left eye and the user's right eye;
   receive first user input to switch presentation of the first content from one of the left eye portion and the right eye portion to the other of the left eye portion and the right eye portion; and
   based on receipt of the first user input, use the device to present the first content on the other of the left eye portion and the right eye portion so that the first content is viewable respectively using one of a user's left eye and the user's right eye but not the other of the user's left eye and the user's right eye.

2. The device of claim 1, wherein the device comprises a headset, and wherein the at least one display comprises an at least partially transparent display through which the user can view real-world objects while wearing the headset.

3. The device of claim 1, wherein the instructions are executable by the at least one processor to:
   receive second user input to present the first content on one of the left eye portion and the right eye portion, the second user input being received prior to receipt of the first user input; and
   based on receipt of the second user input, use the device to present the first content on one of the left eye portion and the right eye portion so that the first content is viewable respectively using one of the user's left eye and the user's right eye but not the other of the user's left eye and the user's right eye.

4. The device of claim 3, wherein the instructions are executable by the at least one processor to:
   present a graphical user interface (GUI) on the at least one display, the second user input selecting a selector from the GUI.

5. The device of claim 3, wherein the second user input comprises one or more of: voice input, gesture input, eye input.

6. The device of claim 3, wherein the instructions are executable by the at least one processor to:
   use the device to present second content on the left eye portion, the second content being different from the first content;
   while the second content is presented on the left eye portion, receive the second user input, wherein the second user input is to use the device to present the first content on the right eye portion; and
   based on receipt of the second user input, use the device to present the first content on the right eye portion so that the first content is viewable using the user's right eye but not the user's left eye.

7. The device of claim 6, wherein the instructions are executable by the at least one processor to:
   based on receipt of the second user input, use the device to remove the second content from being presented the left eye portion.

8. The device of claim 1, wherein the instructions are executable by the at least one processor to:
   use the device to present the first content on the left eye portion;
   while the first content is presented on the left eye portion, receive the first user input, wherein the first user input commands the device to switch the first content to being presented using the device on the right eye portion; and
   based on receipt of the first user input, use the device to switch to presenting the first content on the right eye portion but not the left eye portion so that the first content is viewable using the user's right eye but not the user's left eye.

9. The device of claim 8, wherein the first user input commanding the device to present the first content on the right eye portion comprises the user switching from left eye open, right eye closed to right eye open, left eye closed.

10. The device of claim 9, wherein the instructions are executable by the at least one processor to:
    based on receipt of the first user input commanding the device to present the first content on the right eye portion, present a request to confirm changing presentation of the first content; and
    responsive to receiving a response to the request, use the device to switch to presenting the first content on the right eye portion but not the left eye portion so that the first content is viewable using the user's right eye but not the user's left eye.

11. The device of claim 3, wherein the instructions are executable by the at least one processor to:
    use the device to present the first content on one of the left eye portion and the right eye portion but not the other of the left eye portion and the right eye portion;
    receive second user input, the second user input comprising going to both eyes open from one of: left eye open, right eye closed; and right eye open, left eye closed; and
    based on receipt of the second user input, use the device to present second content using both the right eye portion and the left eye portion.

12. A method, comprising:
    using eye tracking software to determine, at a device, that a user's left eye is closed and that the user's right eye is open;
    based on the determination using the eye tracking software that the user's left eye is closed and that the user's right eye is open, controlling the device to present first content on a right eye portion of at least one display of a device but not a left eye portion of the at least one display of the device;
    using the eye tracking software to determine, at the device, that the user has transitioned from left eye closed, right eye open to both eyes open, the user transitioning left eye closed, right eye open to both eyes open being identified as input to present second content on both the left and right eye portions, the second content being different from the first content; and
    controlling the device to present, based on receipt of the input, the second content on both the left and right eye portions.

13. The method of claim 12, comprising:
    presenting at least a first icon via the at least one display, the first icon indicating a particular mode of user input that is currently enabled for providing commands to present contents via the at least one display, the particular mode of user input selected from the group consisting of: voice input, gesture input, eye input.

14. The method of claim 12, comprising:

presenting a graphical user interface (GUI) on at least a portion of the at least one display, the GUI comprising a first selector, a second selector, and a third selector, each of the first, second, and third selectors being selectable to provide respective commands to the device regarding presentation of content on the at least one display, the first selector being selectable to provide a command to the device to present content on the left eye portion but not the right eye portion, the second selector being selectable to provide a command to the device to present content on the right eye portion but not the left eye portion, and the third selector being selectable to provide a command to the device to present content using both the left and right eye portions.

15. A computer readable storage medium (CRSM) that is not a transitory signal, the computer readable storage medium comprising instructions executable by at least one processor to:

identify, at a device and using eye tracking software, a user's left eye as being closed; and based on and responsive to the identification of the user's left eye as being closed, control the device to present first content on a right eye portion of at least one display so that the first content is viewable via the right eye portion but not a left eye portion of the at least one display.

16. The CRSM of claim 15, wherein the instructions are executable to:

identify, at the device and using the eye tracking software, the user switching from left eye closed to left eye open; and responsive to identifying the user switching from left eye closed to left eye open, present second content on the left eye portion of the at least one display but not the right eye portion of the at least one display.

17. The CRSM of claim 16, wherein the second content is the same as the first content.

18. The device of claim 1, wherein the instructions are executable to:

execute eye tracking software; and identify the first user input using the eye tracking software.

19. The device of claim 1, wherein the instructions are executable to:

while the first content is presented using one of the left eye portion and the right eye portion, execute eye tracking software to identify second user input to switch from presenting the first content using one of the left eye portion and right eye portion to presenting second content using both the left eye portion and right eye portion, the second content being different from the first content, the second content not comprising the first content; and present, using the device and based on the identification using the eye tracking software of the second user input, the second content using both the left eye portion and right eye portion.

20. The device of claim 10, wherein the request is a visual request presented using the at least one display.

* * * * *